(12) United States Patent
Hong et al.

(10) Patent No.: US 11,338,806 B2
(45) Date of Patent: May 24, 2022

(54) BRAKE-STEERING APPARATUS FOR CONTROLLING AUTONOMOUS NAVIGATION OF AN ELECTRIC SCOOTER

(71) Applicant: Ford Global Technologies, LLC, Dearborn, MI (US)

(72) Inventors: Sanghyun Hong, Ann Arbor, MI (US); Jianbo Lu, Northville, MI (US); Justin Miller, Berkley, MI (US); Smruti Panigrahi, Farmington Hills, MI (US); Timothy Feldkamp, Ann Arbor, MI (US); Zhijun Han, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 327 days.

(21) Appl. No.: 16/561,569

(22) Filed: Sep. 5, 2019

(65) Prior Publication Data

US 2021/0070294 A1  Mar. 11, 2021

(51) Int. Cl.
*B60W 60/00* (2020.01)
*B60W 30/18* (2012.01)
(Continued)

(52) U.S. Cl.
CPC ............ *B60W 30/18* (2013.01); *B60W 10/18* (2013.01); *B60W 10/20* (2013.01); *G05D 1/0088* (2013.01);
(Continued)

(58) Field of Classification Search
CPC ............. A63H 17/22; B60W 2300/36; B60W 2300/365; B60Y 2200/12; B60Y 2200/126; B62K 3/002; B62K 11/00; B62K 2202/00; B60L 15/2036; B60T 11/21; B62D 11/08; B62D 7/1509; B62D 7/1518; B62D 7/1554; B62D 7/1581; B62D 15/024; B62D 9/005; B62D 11/00; B62D 11/001;
(Continued)

(56) References Cited

U.S. PATENT DOCUMENTS 6,050,357 A * 4/2000 Staelin .................. B60L 3/0092
 180/65.1
6,467,560 B1 * 10/2002 Anderson .............. A63C 17/01
 180/181

(Continued)

*Primary Examiner* — Christian Chace
*Assistant Examiner* — Jordan S Fei
(74) *Attorney, Agent, or Firm* — Brandon Hicks; Eversheds Sutherland (US) LLP

(57) ABSTRACT

A bake-steering apparatus for controlling autonomous navigation of an electric scooter includes at least one electric motor coupled to at least one wheel of the scooter to provide driving power to enable forward momentum of the scooter, at least a pair of brake pads on the scooter such that each brake pad is adapted to make mechanical braking contact with respective ones of the wheels to provide navigational steering of the scooter, and a computational module on the scooter and electrically connected to each brake pad. The computational module is adapted to receive electrical signals and compute them into corresponding braking commands so as to determine the mechanical braking contact to generate corresponding slowing and turning of the forward momentum of the scooter so as to provide navigational steering of the scooter.

6 Claims, 3 Drawing Sheets

(51) Int. Cl.
*G05D 1/00* (2006.01)
*B60W 10/18* (2012.01)
*B60W 10/20* (2006.01)

(52) U.S. Cl.
CPC ... *B60W 2300/365* (2013.01); *B60W 2710/18* (2013.01); *B60W 2710/20* (2013.01); *B62K 2202/00* (2013.01)

(58) Field of Classification Search
CPC ... B62D 11/005; B62D 11/006; B62D 11/008; B62D 11/02; B62D 11/04; B62D 11/06; B62D 11/10; B62D 11/105; B62D 11/12; B62D 11/14; B62D 11/16; B62D 11/18; B62D 11/183; B62D 11/186; B62D 11/20; B62D 11/22; B62D 11/24; A63C 17/00; A63C 17/01; A63C 17/011; A63C 17/012; A63C 17/013; A63C 17/014; A63C 17/015; A63C 17/016; A63C 17/017; A63C 17/018; A63C 17/14; A63C 17/1409; A63C 17/1418; A63C 17/1427; A63C 17/1436; A63C 17/1445; A63C 17/1454; A63C 2017/1463; A63C 2017/1472; A63C 2017/1481; A63C 2017/149; A61G 5/1021; B60G 2400/37; B60G 2800/215
See application file for complete search history.

(56) References Cited

U.S. PATENT DOCUMENTS

| | | | |
|---|---|---|---|
| 7,293,622 B1 * | 11/2007 | Spital | A63C 17/12 180/180 |
| 2011/0231052 A1 * | 9/2011 | Ellis | B60T 8/246 701/31.4 |

\* cited by examiner

BRAKE-STEERING APPARATUS FOR CONTROLLING AUTONOMOUS NAVIGATION OF AN ELECTRIC SCOOTER

FIELD

The disclosure is directed to an electric scooter and more particularly to a brake-steering apparatus for controlling autonomous navigation of an electric scooter.

BACKGROUND

In densely-populated urban areas, one alternative type is a personal mobility device in the form of an electric scooter, commonly referred to as an eScooter. The electric scooters are being introduced in to selected areas of several major metro cities with the expectation that they will be a viable, cost-effective transportation alternative.

Typically, companies own multiple electric scooters and operate in accordance with a business model that provides short-usage to customers who pay for the time of use. Revenue for these companies is dependent on the utilization rate of each electric scooter which is increased by ensuring that a customer in need of an electric scooter will have easy access to one.

One source of cost for these companies is capital costs associated with electric scooter purchase. Electric scooter prices need to be economical so that companies can (a) roll out many electric scooters throughout a city, and (b) minimize the impact of vandalism. A second source of cost is the price for recharging the batteries of the electric scooters. Typically, companies owning electric scooters pay independent contractors to collect them, charge them, and then redeploy them. However, such manner of independent contractor usage adds significantly to this second source of cost.

DETAILED DESCRIPTION

Overview

Figure 1:
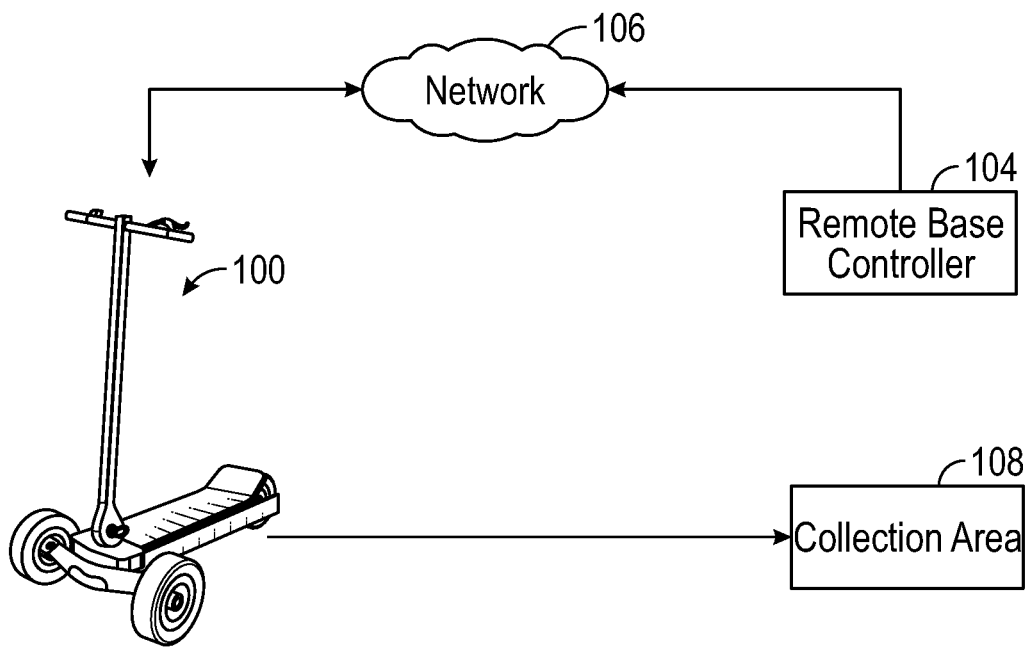
FIG. 1 illustrates a three-wheeled electric scooter which may be used in conjunction with a brake-steering apparatus operable to autonomously navigate the electric scooter to a desired destination so as to thereby reduce its aforementioned costs.

The disclosure is directed to steering mechanisms used for three-wheeled and two-wheeled autonomous eScooters. In some instances, the steering mechanism uses differential friction on the front wheels of the eScooters. For example, the eScooter steering board rotates using one or more motors (e.g., to take a left turn, the eScooter board rotates clockwise, which causes an adjustment of the gap between a front wheel and a brake pad and vice versa to turn right). In other instances, the eScooter board does not rotate, but instead the brake pads move up and down to make contact with the front wheels (e.g., if the eScooter wants to take a left turn, the right brake pad moves down to contact the front left wheel and vice versa to turn right). In yet other instances, such as with two-wheeled autonomous eScooters, the eScooter moves two "training wheels" down to contact the ground, and each wheel has a brake pad attached thereto. To turn left, the left training wheel slows down due to the braking force and vice versa to turn right.

Illustrative Embodiments

The following detailed description is merely exemplary in nature and is not intended to limit the described embodiments or the application and uses of the described embodiments. Like reference numerals herein refer to like parts throughout the several views of the drawings. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper", "lower", "left", "rear", "right", "front", "vertical", "horizontal", and derivatives thereof shall relate to the invention as oriented in FIG. 1. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

Figure 2:
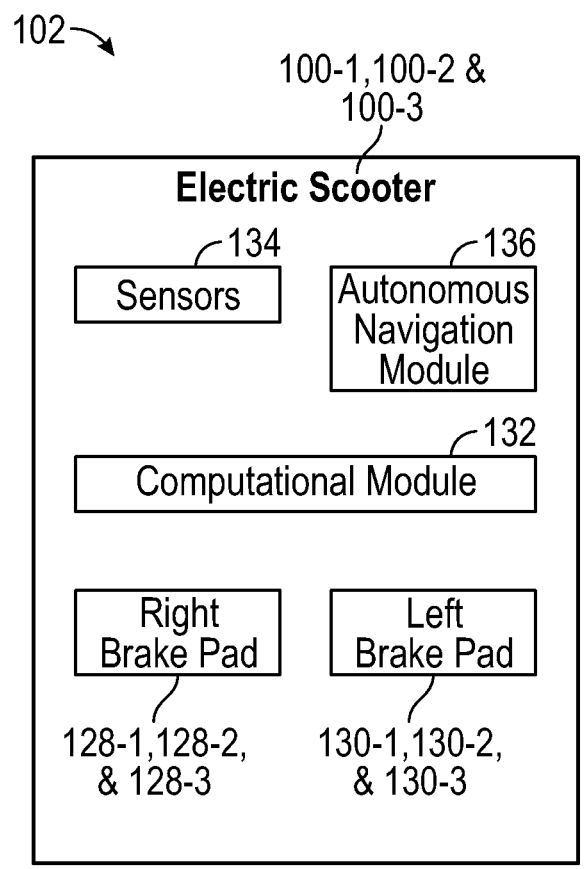
FIG. 2 illustrates, in block diagram form, an exemplary embodiment of a brake-steering apparatus applied on an electric scooter for autonomously navigating it to the desired destination.
Figure 3:
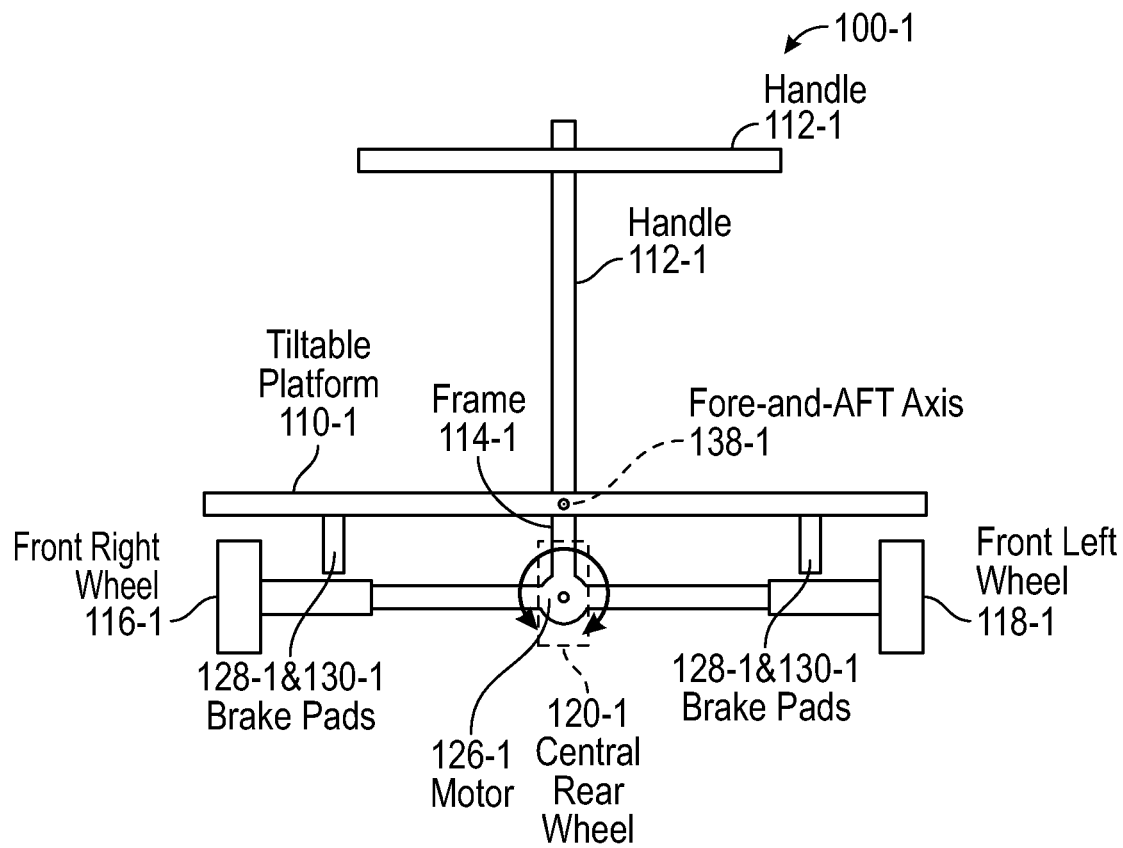
FIG. 3 illustrates, in diagrammatic form, a front view of the brake-steering apparatus on one embodiment of the three-wheeled electric scooter.
Figure 4:
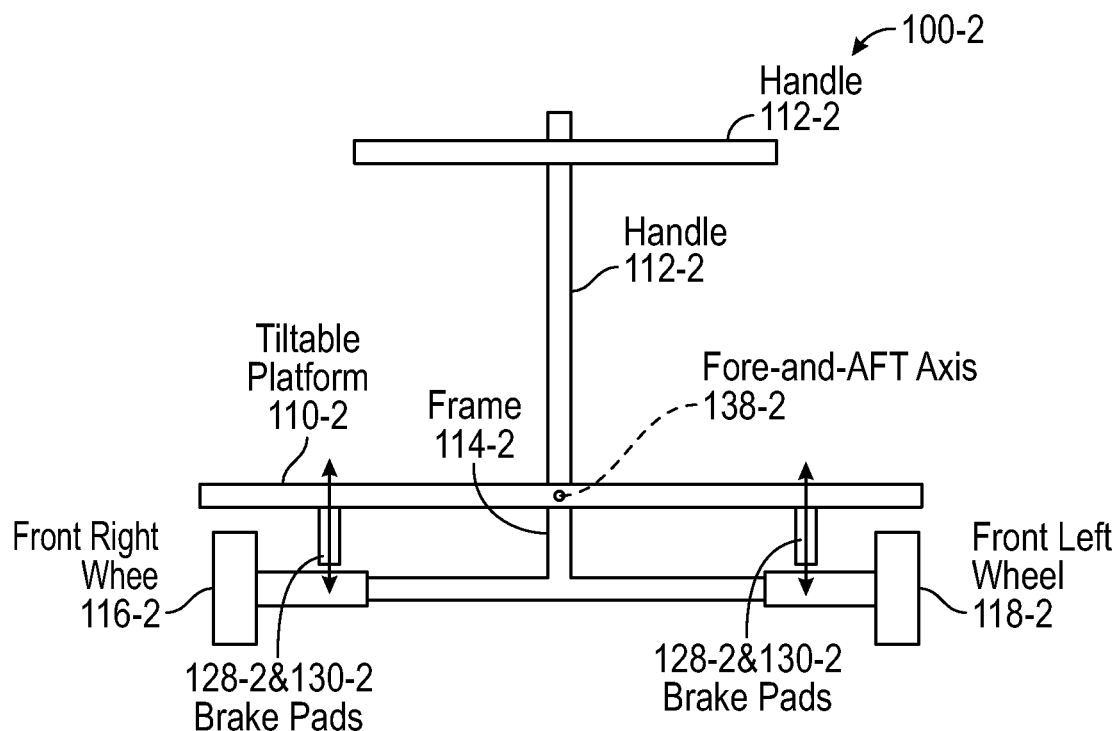
FIG. 4 illustrates, in diagrammatic form, a front view of the brake-steering apparatus on another embodiment of the three-wheeled electric scooter.
Figure 5:
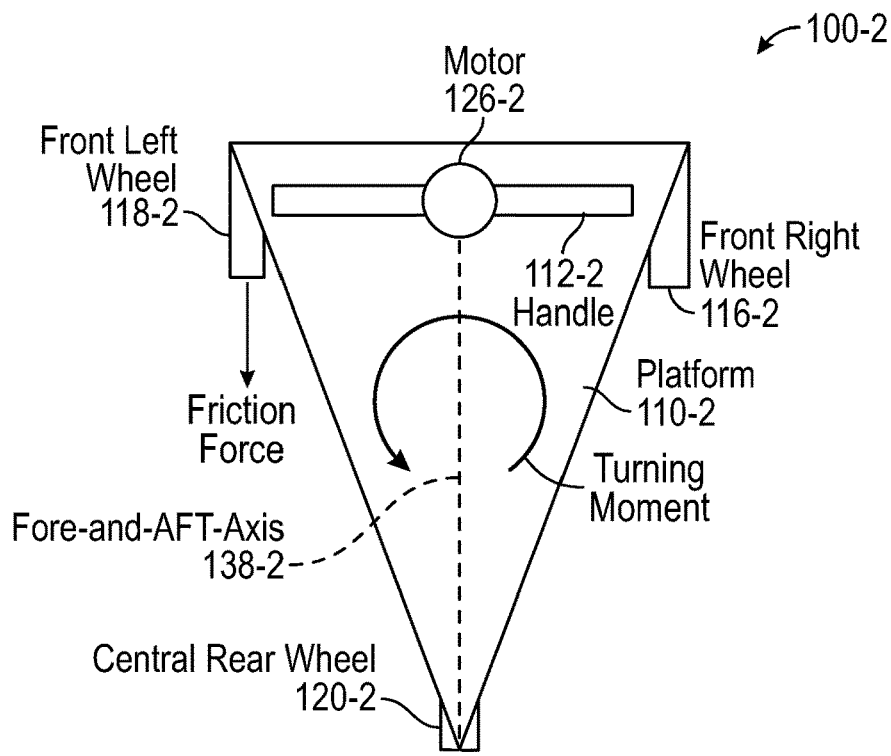
FIG. 5 illustrates, in diagrammatic form, a top view of the brake-steering apparatus on the three-wheeled electric scooter of FIG. 4.
Figure 6:
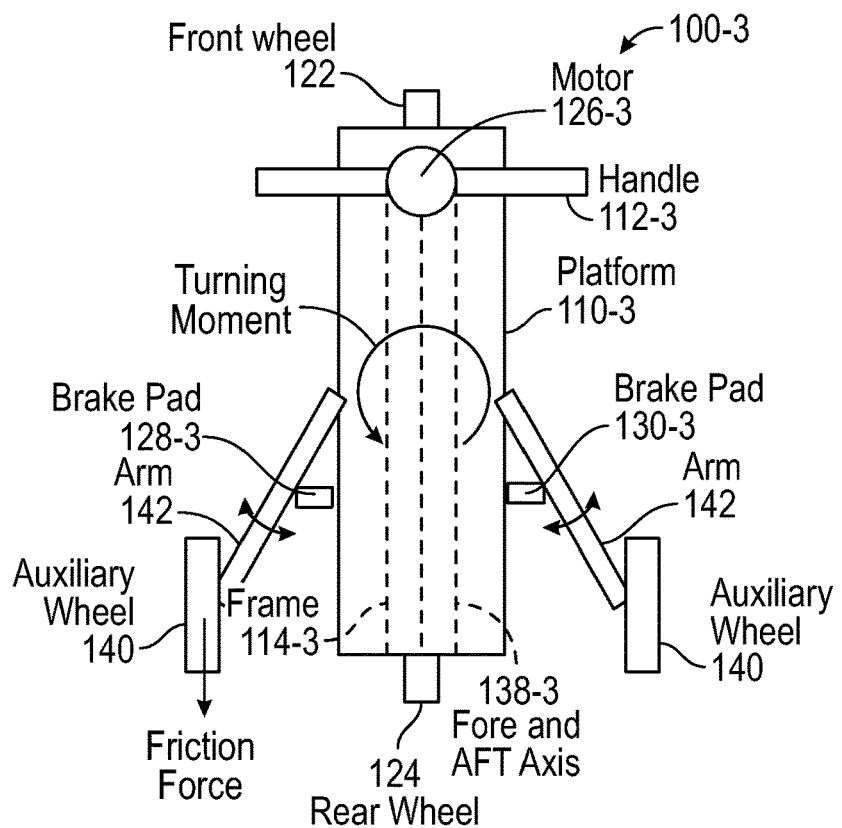
FIG. 6 illustrates, in diagrammatic form, a top view of the brake-steering apparatus on one embodiment of a two-wheeled electric scooter.

Referring now to the drawings, an electric scooter 100 shown in FIG. 1 is illustrated in different embodiments in FIGS. 3-6. The first embodiment of the electric scooter, generally designated 100-1 as shown in FIG. 3 and the second embodiment of the electric scooter, generally designated 100-2 as shown in FIGS. 4 and 5, are three-wheel electric scooters. The third embodiment of the electric scooter, generally designated 100-3 as shown in FIG. 6, is a two-wheel electric scooter. Each of the electric scooters 100-1 to 100-3 may be used in conjunction with a brake-steering apparatus, generally designated 102 in FIG. 2.

The brake-steering apparatus 102 installed on each of the electric scooters 100-1 to 100-3 may be in wireless communication with a remote base controller 104 via an Internet cloud connection 106 or any other suitable wireless network arrangement. The remote base controller 104 may be operated to send wireless electric signals via the Internet cloud connection 106 to each of the electric scooters 100-1 to 100-3 to control their brake-steering apparatus 102 so as to allow autonomous navigation of the electric scooters, when in an autonomous navigational mode. In such manner, the electric scooters 100-1 to 100-3 may be autonomously navigated to a desired destination, such as a collection area 108 where they may be recharged, serviced, and then deployed back to a desired location where they will be available for re-use.

Each of the electric scooters 100-1 to 100-3 have a plurality of wheels. In addition, the electric scooters 100-1 to 100-3 have respective elongated platforms 110-1 to 110-3 (also commonly referred to as boards or decks), upright handles 112-1 to 112-3, and frames 114-1 to 114-3 configured to support the platforms 110-1 to 110-3 and elongated handles 112-1 to 112-3 and supported by the plurality of wheels. The platforms 110-1 to 110-3 are configured to support the weight of a rider using the electric scooter. More particularly, the electric scooter 100-1, constituting the first embodiment shown in FIG. 3, has two spaced apart, right and left wheels 116-1, 118-1 supported by the frame 114-1 at the front thereof and one central wheel 120-1 supported by the frame 114-1 at the rear thereof and intermediately between and spaced rearwardly of the two right and left front wheels 116-1, 118-1. The electric scooter 100-2, constituting the second embodiment shown in FIGS. 4 and 5, has two spaced apart, right and left front wheels 116-2, 118-2 and one central, rear wheel 120-2 supported by the frame 114-2. The electric scooter 100-3, constituting the third embodiment shown in FIG. 6, has one front wheel 122 supported by the frame 114-3 at the front and another wheel 124 supported by the frame 114-3 at the rear, thus at opposite ends of the frame.

As seen in FIG. 2, the brake-steering apparatus 102 installed on each of the electric scooters 100-1 to 100-3 for controlling their autonomous navigation includes at least one electric motor 126-1 to 126-3, at least a pair of brake pads 128-1 to 128-3 and 130-1 to 130-3, and a computational module 132. The respective electric motors 126-1 to 126-3 are mounted on the electric scooters 100-1 to 100-3 and coupled to at least one of the plurality of wheels thereof to provide driving power to enable forward momentum of the respective electric scooter. Each of the brake pads 128-1 to 128-3 and 130-1 to 130-3 is adapted to make mechanical braking contact, on a differential frictional basis relative to one another, with respective ones of the wheels to provide navigational steering of the respective electric scooter. The computational module 132 is mounted on the respective electric scooter 100-1 to 100-3 and electrically connected to each of the brake pads 128-1 to 128-3 and 130-1 to 130-3. The computational module 132 is adapted to receive electrical signals and compute them into corresponding braking commands so as to determine the mechanical braking contact on the differential frictional basis, to generate corresponding slowing and turning of the forward momentum of the respective electric scooter so as to provide navigational steering thereof. The brake-steering apparatus 102 may also include one or more sensors 134 mounted on the respective electric scooter 100-1 to 100-3 and adapted to receive wireless electric signals transmitted from the remote base controller 104 and generate sensor signals, and an autonomous navigation module 136 mounted on the respective electric scooter 100-1 to 100-3 to receive the sensor signals from the sensor 134 and in response thereto switch the electric scooter from normal mode to an autonomous navigation mode and generate steering commands to the computational module 132.

FIG. 3 schematically depicts a front view of the brake-steering apparatus 102 installed on the first embodiment of the electric scooter 100-1. In this first embodiment of the electric scooter 100-1, its respective platform 110-1 is rotatably mounted on the frame 114-1 of the electric scooter for undergoing tilting clockwise and counterclockwise rotation in a transverse relationship about a respective fore-and-aft axis 138-1 of the electric scooter. The brake pads 128-1, 130-1 are attached to an underside of the respective platform 110-1 at locations displaced in opposite directions from the fore-and-aft axis 138-1 and in proximity to the right and left front wheels 116-1, 118-1 in order to make mechanical braking contact with the right and left front wheels corresponding to the tilting of the platform 110-1 and without changing the shape of the brake pads. The platform 110-1 is coupled to the electric motor 126-1 and tilted by the electric motor based on the braking commands received from the computational module 132. Also, the elongated handle 112-1 is mounted upright on the frame 114-1 of the electric scooter 100-1 independent of the rotatable platform 110-1 thereof.

Referring to FIGS. 4 and 5, there is illustrated, in diagrammatic form, front and top views of the brake-steering apparatus 102 installed on the second embodiment of the electric scooter 100-2. In this second embodiment of the electric scooter 100-2, its respective platform 110-2 is stationarily mounted on the frame 114-2 of the electric scooter relative to a respective fore-and-aft axis 138-2 of the electric scooter. The brake pads 128-2, 130-2 are attached to an underside of the respective platform 110-2 at locations displaced in opposite directions from the fore-and-aft axis 138-2 and in proximity to the right and left front wheels 116-2, 118-2. The brake pads 128-2, 130-2 are adapted to be electrically actuated to change their respective shapes based on the braking commands received from the computational module 132 to make corresponding mechanical braking contact, on a differential frictional basis relative to one another, with respective ones of the front wheels of the electric scooter to provide navigational steering of the electric scooter. Also, the elongated handle 112-2 is stationarily mounted upright on the platform 110-2 of the electric scooter.

Referring to FIG. 6, there is illustrated, in diagrammatic form, a top view of the brake-steering apparatus 102 installed on the third embodiment of the electric scooter 100-3. In this third embodiment of the electric scooter 100-3, its respective platform 110-3 is stationarily mounted on the frame 114-3 of the electric scooter relative to a respective fore-and-aft axis 138-3 extending along the frame of the electric scooter. Further, a pair of auxiliary wheels 140 are each installed on a corresponding outer end portion of one of a pair of arms 142 being installed at locations displaced in opposite directions from the fore-and-aft axis 138-3 and movable toward and away from the platform 110-3 to make contact with ground supporting the electric scooter after moving away from the platform. The brake pads 128-3, 130-3 extend between and are attached to the arms 142 and the electric scooter platform 110-3. The brake pads 128-3, 130-3 are adapted to be electrically actuated to change their respective shapes based on the braking commands received from the computational module 132 to make corresponding mechanical braking contact, on a differential frictional basis relative to one another, with the respective ones of the arms 142 to provide navigational steering of the electric scooter. Also, the elongated handle 112-3 is stationarily mounted upright on the platform 110-3 of the electric scooter.

In conclusion, the electric scooter 100-1 of the first embodiment is manually steered by a rider leaning left or right or autonomously steered by the above-described action of the brake pads 128-1, 130-1 causing the desired tilting of the platform 110-1 resulting in the desired turning of the electric scooter 100-1. The electric scooter 110-2 of the second embodiment is manually steered by a rider turning the handle 112-2 or autonomously steered by the above-described action of the brake pads 128-2, 130-2 to cause the desired turning of the electric scooter 100-2. The electric scooter 110-3 of the third embodiment is manually steered by a rider turning the handle 112-3 or autonomously steered by the above-described action of the auxiliary wheels 140 and brake pads 128-3, 130-3 to cause the desired turning of the electric scooter 100-3.

Although specific embodiments of the disclosure have been described, numerous other modifications and alternative embodiments are within the scope of the disclosure. For example, any of the functionality described with respect to a particular device or component may be performed by another device or component. Further, while specific device characteristics have been described, embodiments of the disclosure may relate to numerous other device characteristics. Further, although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments may not include, certain features, elements, and/or steps. Thus, such conditional language is not generally intended to imply that features, elements, and/or steps are in any way required for one or more embodiments.

What is claimed is:

1. A brake-steering apparatus for controlling autonomous navigation of an electric scooter, comprising:
    at east one electric motor mounted on the electric scooter and coupled to at east one of a plurality of wheels of the electric scooter to provide driving power to enable forward momentum of the electric scooter;
    a plurality of brake pads mounted on the electric scooter such that each of the brake pads is adapted to make mechanical braking contact, on a differential frictional bask relative to one another, with respective ones of the wheels of the electric scooter to provide navigational steering of the electric scooter;
    a computational module mounted on the electric scooter and in electrical communication to each of the brake pads, the computational module being adapted to receive electrical signals and compute them into corresponding braking commands to determine the mechanical braking contact, on the differential frictional bask, to generate corresponding slowing and turning of the forward momentum of the electrical scooter to provide navigational steering of the electric scooter; and
    a platform rotatably mounted on the electric scooter for undergoing tilting clockwise and counterclockwise rotation in a transverse relationship about a fore-and-aft axis of the electric scooter, the brake pads being attached to an underside of the platform at locations displaced in opposite directions from the fore-and-aft axis and in proximity to a front pair of the wheels in order to make mechanical braking contact with the front wheels corresponding to the tilting of the platform, the platform being coupled to the at least one electric motor and tilted by the at least one electric motor based on the braking commands received from the computational module.

2. The brake-steering apparatus as recited claim 1, further comprising an elongated handle mounted upright on the electric scooter independent of the rotatable platform of the electric scooter.

3. The brake-steering apparatus as recited in claim 1, wherein the wheels on the electric scooter includes the pair of front wheels and a rear wheel located intermediately between and spaced rearwardly of the pair of front wheels.

4. A brake-steering apparatus for controlling autonomous navigation of an electric scooter, comprising:
    at least one electric motor mounted on an electric scooter and coupled to at least one of a plurality of wheels of the electric scooter to provide driving power to enable forward momentum of the electric scooter;
    at least a pair of brake pads mounted on the electric scooter such that each of the brake pads is adapted to make mechanical braking contact, on a differential frictional basis relative to one another, with respective ones of the wheels of the electric scooter to provide navigational steering of the electric scooter;
    at least one sensor mounted on the electric scooter and adapted to receive wireless electric signals transmitted from a remote location and generate sensor signals;
    an autonomous navigation module mounted on the electric scooter to receive the sensor signals from the sensor and in response thereto switch the electric scooter from normal mode to an autonomous navigation mode and generate steering commands;
    a computational module electrically connected to the autonomous navigation module and electrically connected to each of the brake pads, the autonomous navigation module being adapted to receive the steering commands and transform the steering commands into corresponding braking commands determining the mechanical braking contact, on the differential frictional basis, to generate corresponding slowing and turning of the forward momentum of the electrical scooter to provide navigational steering of the electric scooter; and
    a platform rotatably mounted on the electric scooter for undergoing tilting clockwise and counterclockwise rotation in a transverse relationship about a fore-and-aft axis of the electric scooter, the brake pads being attached to an underside of the platform at locations displaced in opposite directions from the fore-and-aft axis and in proximity to a front pair of the wheels in order to make mechanical braking contact with the front wheels corresponding to the tilting of the platform and without changing the shape of the brake pads, the platform being coupled to the at least one electric motor and tilted by the at least one electric motor based on the braking commands received from the computational module.

5. The brake-steering apparatus as recited in claim 4, further comprising an elongated handle mounted upright on the electric scooter independent of the rotatable platform of the electric scooter.

6. The brake-steering apparatus as recited in claim 4, wherein the wheels on the electric scooter includes the pair of front wheels and a rear wheel located intermediately between and spaced rearwardly of the pair of front wheels.

* * * * *